(12) United States Patent
Schleicher et al.

(10) Patent No.: US 6,293,439 B1
(45) Date of Patent: Sep. 25, 2001

(54) HIGH PRESSURE VALVE

(75) Inventors: Lawrence M. Schleicher, Bartlett; Keith W. Stark, St. Charles, both of IL (US)

(73) Assignee: Chicago Conveyor Corporation, Addison, IL (US)

( * ) Notice: Subject to any disclaimer, the term of this patent is extended or adjusted under 35 U.S.C. 154(b) by 0 days.

(21) Appl. No.: 09/620,382

(22) Filed: Jul. 20, 2000

(51) Int. Cl.[7] .................................................. G01F 11/10
(52) U.S. Cl. ............................................................ 222/368
(58) Field of Search ................................... 222/344, 367, 222/368, 410

(56) References Cited

U.S. PATENT DOCUMENTS

| | | | |
|---|---|---|---|
| 3,151,784 | 10/1964 | Tailor | 222/368 |
| 4,565,305 | 1/1986 | Fischer et al. | 222/368 |
| 4,602,727 | * 7/1986 | Jackson | 222/368 |
| 4,915,265 | 4/1990 | Heep et al. | 222/368 |
| 4,946,078 | 8/1990 | Heep et al. | 222/368 |
| 5,201,441 | 4/1993 | Hoppe et al. | 222/368 |
| 5,381,933 | 1/1995 | Beirle et al. | 222/368 |
| 5,392,964 | 2/1995 | Stapp et al. | 222/368 |
| 5,472,305 | * 12/1995 | Ikeda et al. | 222/368 |

* cited by examiner

*Primary Examiner*—Joseph A. Kaufman
(74) *Attorney, Agent, or Firm*—Piper Marbury Rudnick & Wolfe

(57) ABSTRACT

A high pressure rotary valve including a housing with inlet and outlet openings and a rotor and blade assembly within the housing for moving flowable solid material through the valve. The chamber containing the rotor assembly is defined between a pair of shrouds which move relative to a wall portion of the housing. The periphery of each shroud is ground and hard coated and this periphery is engaged by a first lip seal or multiple thereof supported by the housing. An end plate is located around the rotor shaft at each end of the housing and second lip seals engage ground and hard coated surfaces of the rotor shaft. Pockets defined between the shrouds and the end plates are adapted to be pressurized to create a back pressure resisting movement of material out of the housing chamber in the direction of the rotor shaft. Angular contact bearings support the rotating shaft with respect to the housing.

6 Claims, 5 Drawing Sheets

HIGH PRESSURE VALVE

BACKGROUND OF THE INVENTION

This invention relates to a high pressure rotary valve suited for use in the conveying or feeding of flowable, or pelletized granulated bulk material, friable products, fine powders, and the like. A pneumatic system of positive blowers and negative pressure means is normally used for imparting the conveying forces needed for moving the material to and from the valve outlet through the system.

Valves of the type contemplated include a housing defining a chamber and having a top inlet and a bottom outlet communicating with the chamber. Within the housing chamber there is provided a rotor which includes a plurality of blades supported on a horizontal shaft. The material being conveyed is fed to the housing inlet and then into the spaces defined between the blades. The rotor movement conveys the material to the outlet location of the housing for discharge of the material from the housing. Since the rotor speed can be controlled, the valve serves as a means for regulating the rate at which the material is conveyed in the feed line extending from the housing outlet to the equipment being supplied with the material.

It is important to provide means for sealing of the housing chamber so that the material being conveyed does not penetrate into regions where there are relatively movable parts, such as the area occupied by the rotor shaft which moves relative to bearings mounted in the housing. Such penetration, particularly in the case where relatively abrasive materials are being handled, can cause undue wear of parts and excessive downtime for replacement thereof.

Critical to efficient and consistent material flow through the pneumatic system, as well as maintaining material integrity, is the sustaining of line gas flows. Rotor, housing and bearing arrangement and assembly methodology are critical to prevent loss of mass and volumetric gas flow. When left unchecked, such drops in gas flow adversely effect material conveyance throughout the system.

The use of seals is also important for purposes of preventing leaking of the material being conveyed into the atmosphere surrounding the housing. This is particularly the case where toxic materials or the like are being conveyed.

The provision of adequate sealing arrangements is often problematical due the fact that the material is being conveyed under high pressure conditions, thereby increasing the tendency for movement of the material axially with respect to the rotor shaft rather than towards the discharge end of the housing. Packing glands and O-ring arrangements have been designed with a view toward eliminating or minimizing such problems, however, such prior art arrangements have been proven to be either unduly expensive, have been subject to frequent maintenance, have been ineffective, or have been characterized by a combination of these problems.

SUMMARY OF THE INVENTION

The rotary valve of this invention is of the type comprising a housing defining a material holding chamber and having an inlet at the top end and an outlet at the bottom end communicating with this chamber. In a typical system, granulated bulk material will be delivered to the inlet location and then moved through the housing chamber to the outlet for passage into a line leading to processing equipment for the material. Within this chamber there is provided a rotor carrying a plurality of spaced apart blades, and the material is carried within the spaces between the blades from the inlet to the outlet of the housing. In this manner, the rate at which the material is conveyed in the line leading to the processing equipment can be regulated by controlling the speed of the rotor.

The invention is characterized by a highly effective and not overly expensive sealing arrangement between stationary component surfaces including valve housing surfaces, and the adjacent moving rotor surfaces. Specifically, the rotor is provided with a peripheral shroud positioned at each end of the housing chamber and the outer surfaces of these shrouds move immediately adjacent to stationary inner surfaces of openings in the housing side walls which are provided for receiving the rotor. The shroud outer surfaces are hard coated. A lip seal (or combination thereof) is mounted on each of the adjacent stationary end plate cavities to provide a barrier against movement of material and gas past this point.

A circular end plate is mounted on each side wall of the housing and each end plate defines a central opening for receiving respective smaller diameter outer sections- of the rotor shaft. Outer shaft surfaces which move adjacent the end plate surfaces are ground and hard coated and second lip seals (or combination thereof) are mounted on the end plate for engagement with these surfaces.

At each end of the housing, cavities are defined between the peripheral shrouds and the end plates with the respective lip seals closing off the ends of each cavity. A source of pressurized gas is connected to each end plate for communication with the respective cavities with this pressurized gas supplementing the ability of the lip seals to prevent intrusion of the conveying gases and material.

An arrangement of angular bearings is installed to provide significant additional sealing of the mechanism.

DESCRIPTION OF THE DRAWINGS FIGURES

DESCRIPTION OF THE PREFERRED EMBODIMENTS

Figure 1:
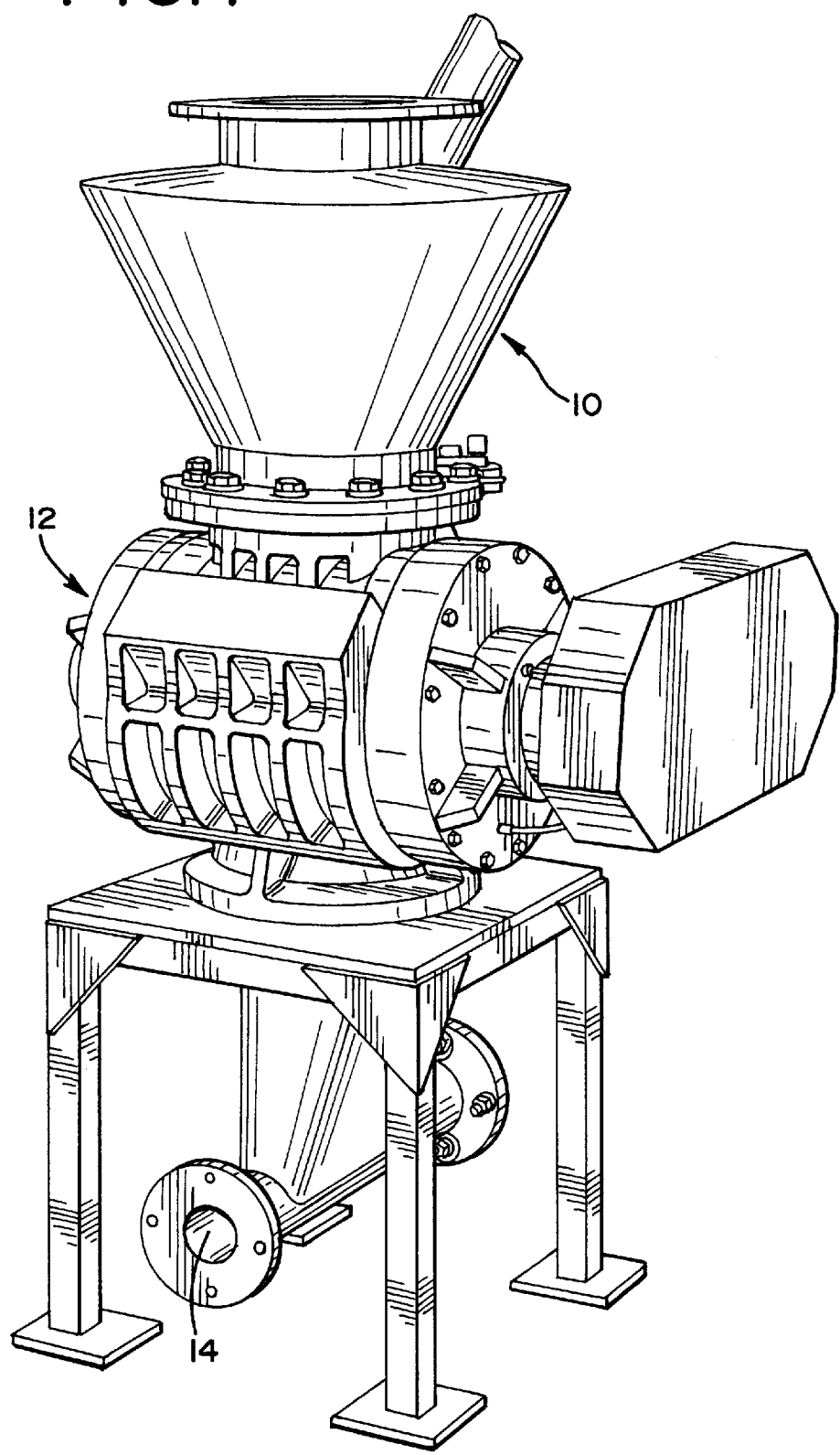
FIG. 1 is an elevational view of an assembly including a rotary valve of the type contemplated by the invention.

FIG. 1 illustrates an assembly of the general type known in the art including a hopper 10 which is employed for delivering granulated bulk material or other flowable solids to a rotary valve 12. Beneath the valve there is provided a line 14 through which material passing through the valve is conveyed to equipment for processing of the material.

Figure 2:
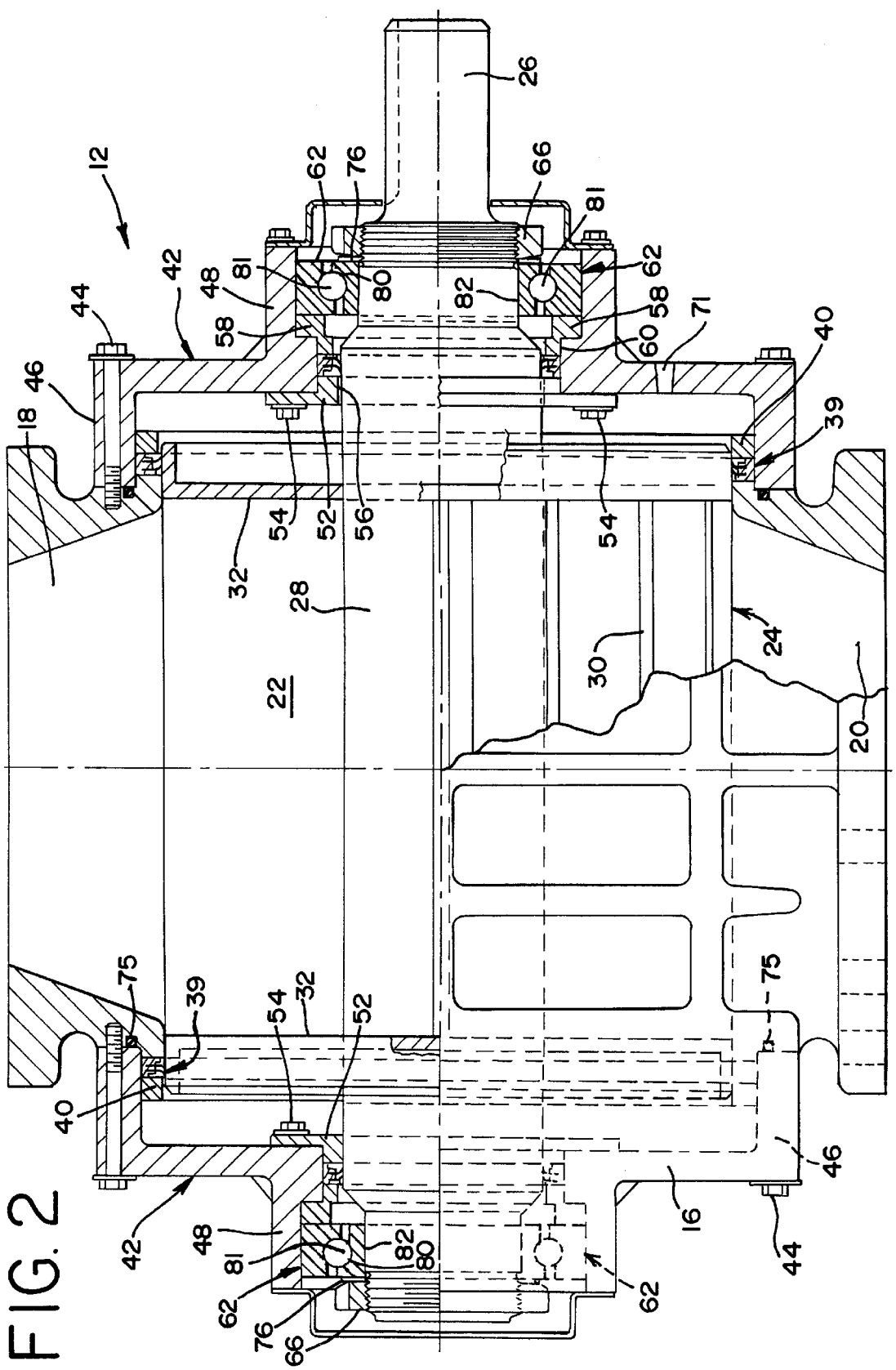
FIG. 2 is a vertical sectional view of the rotary valve characterized by the features of this invention.

FIG. 2 comprises a cross sectional view of the particular rotary valve 12 characterized by the features of this invention. This structure comprises a housing 16 defining an inlet opening 18 at the top and an outlet opening 20 at the bottom. A chamber 22 is defined by the housing intermediate these openings and a rotor 24 is located within this chamber.

The rotor consists of an outer end shaft 26 for connection to a drive motor and a larger diameter middle section 28 upon which blades 30 are mounted. In typical fashion, the material being conveyed is directed from the inlet opening into the spaces defined between adjacent blades.

Figure 5:
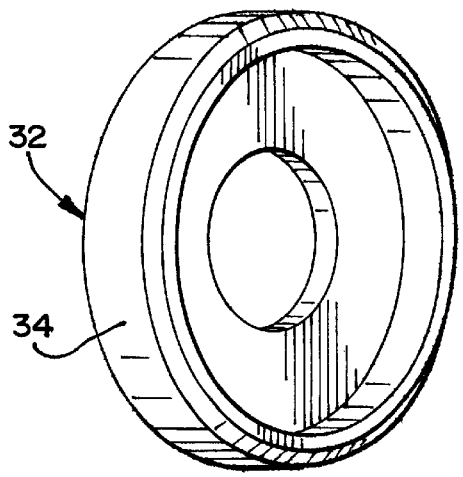
FIG. 5 is a perspective view of a peripheral shroud seal of the type utilized in the practice of the invention.

The material is moved to the vicinity of the outlet opening in response to the rotation of the rotor, and then discharged from the housing through the outlet opening. The opposite ends of the spaces between the blades are closed off by the disc-shaped shrouds 32 attached to the rotor shaft on opposite sides of the chamber 22 (these shrouds are shown in detail in FIG. 5).

Figure 2A:
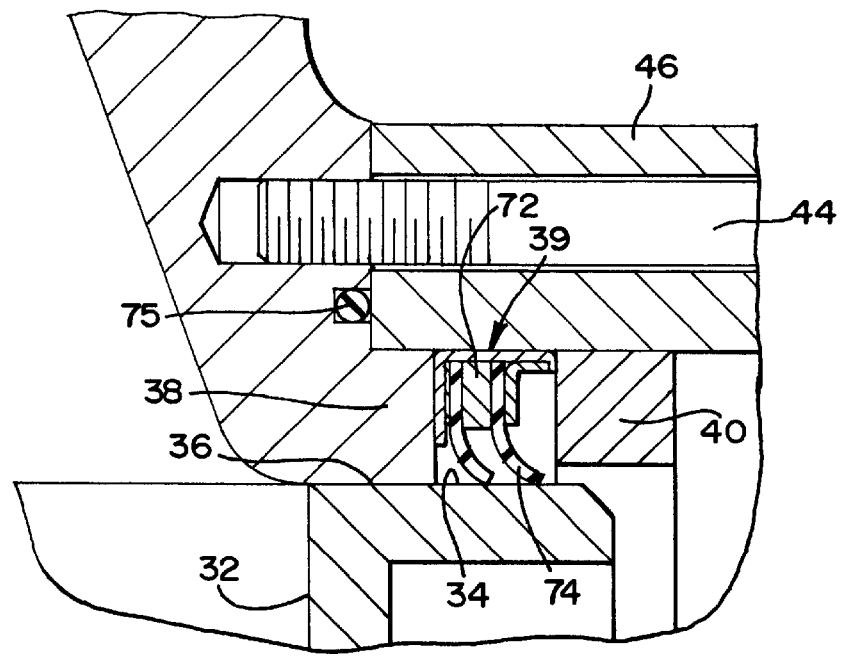
FIG. 2A is an enlarged fragmentary detail view of a first lip seal arrangement used in the practice of the invention.
Figure 6:
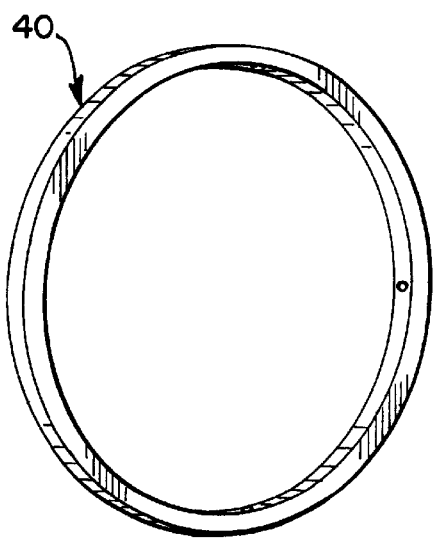
FIG. 6 is a perspective view of a spacer ring of the type utilized in the practice of the invention.

As shown is FIG. 2A, the shrouds 32 define horizontal peripheral surfaces 34 which move, during rotor rotation, relative to stationary housing surfaces 36 defined by the rim portion 38 of the housing. Lip seals 39 are positioned on these rim portions and are held in place by means of retainer rings 40 (also shown in FIGS. 6 and 7). The surfaces 34 are ground and hard coated (such as with the MELONTE process) and it will be noted that the lip seals are in direct engagement with these surfaces. A hard coating thickness in the order of ≦0004 is contemplated.

Figure 2B:
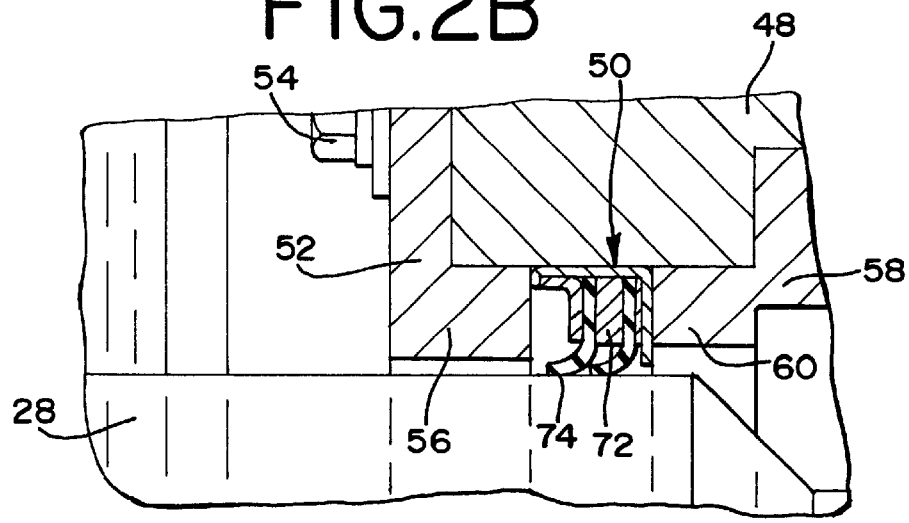
FIG. 2B is an enlarged fragmentary detail view of a second lip seal arrangement.
Figure 3:
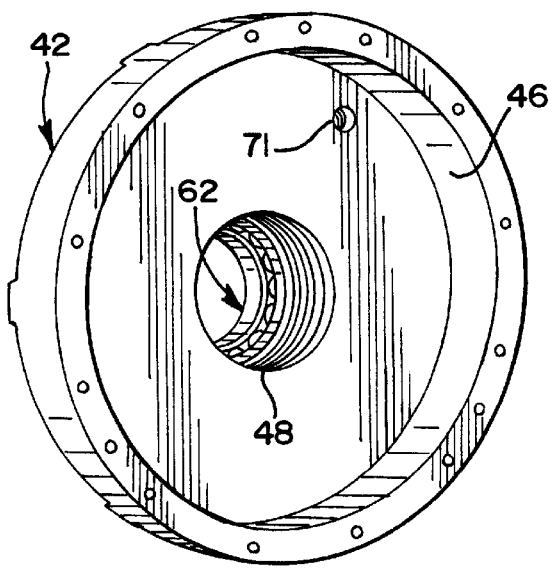
FIG. 3 is a perspective view of an end plate construction and bearing assembly of the type utilized in the practice of the invention.
Figure 4:
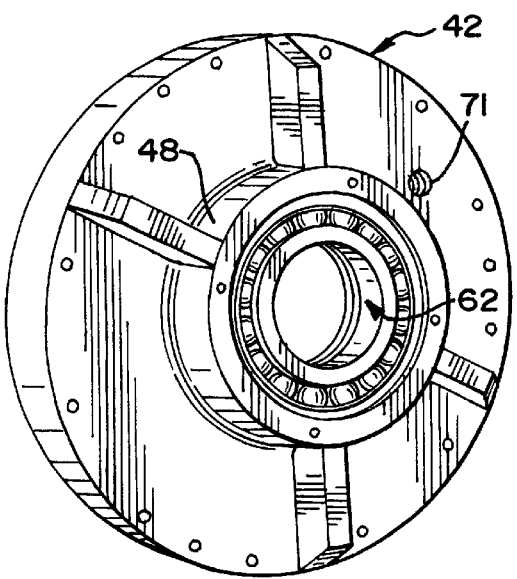
FIG. 4 is an opposite side perspective view of the end plate and bearing assembly.
Figure 7:
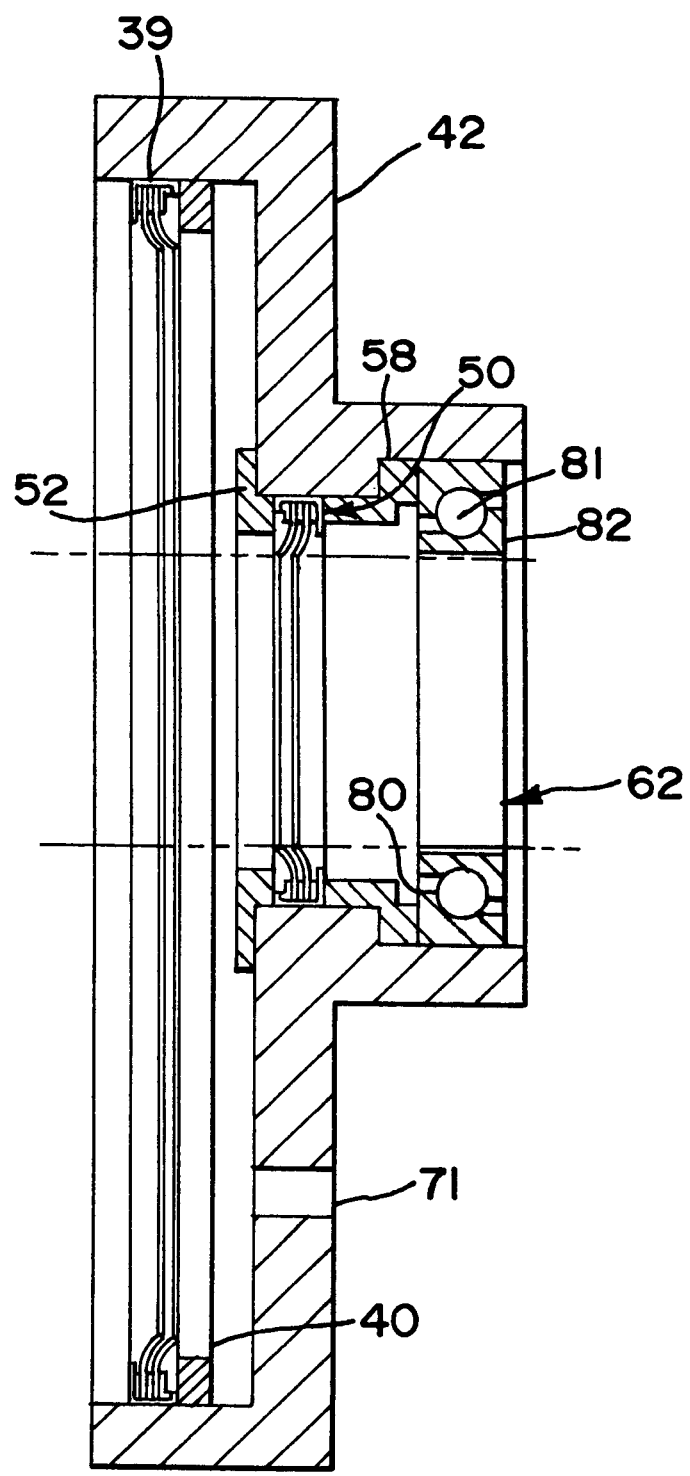
FIG. 7 is a cross sectional view of the end plate, bearing assembly and lip seal arrangements.

End plates 42 are secured on each side of the valve housing by means of bolts 44. These end plates, which are also shown in FIGS. 3, 4 and 7, define inner rims 46 which extend over the locations of the lip seals 39 and retainer rings 40 to thereby confine the lip seals in these locations. The smaller diameter rim portions 48 of the end plates define openings which receive the rotor shaft section 28. Second lip seals 50 (also see FIG. 2B) are positioned for engagement with this shaft section and this surface of the shaft section which is in contact with these lip seals is also ground and hard coated. O-rings 75 are located at the interface of the rims 46 with the housing rim portions 38.

Inner rings 52 are fastened to the end plates by means of bolts 54 and the rims 56 thereof engage one side of the lip seals 50 for thereby serving as spacers and/or removal aids relative to the end plates. Outer rings 58 have a rim portion 60 engaging the opposite sides of the respective seals and the combination of these rings serves to confine the seals in the illustrated location.

Bearing assemblies 62 are mounted inside the outer rim 48 of each end plate and threaded rings locknuts 66 and lock washers 76 serve to confine these assemblies in position relative to the outer rings 58. It has been found that the most efficient operation of the valve is achieved using lubricated, angular contact bearings for this purpose, for example, bearings of the type sold by SKF, Part No. 7220BE. The bearing balls 81 are ramped into position on inclined surface 80 within the bearing housing such that essentially all free play (bearing balls to housing surfaces) is removed: the application of this force is accomplished by applying a torque force such as 680 foot pounds transferred from the threaded locknut (66) to the inner bearing race 82. The bearing 62 is self lubricated via the Micropoly® process.

The area between the shroud 32 at each end of the housing chamber and the lip seal 50 at that end comprises an enclosed pocket or cavity 70. The end plates 42 each have an opening 71 formed in the vertical wall 68 thereof and this provides a means for the introduction of pressurized air into the pocket. This results in back pressure relative to the forces tending to move material past the lip seal 39 at the inner end of the pocket thereby further assisting in preventing material egress.

The particular lip seal arrangement shown, also illustrated in FIG. 2A, consists of a metal ring 72 having a pair of thin flexible rings 74 extending inwardly in a normally parallel, spaced-apart relationship. A dual lip seal of this type may be obtained, for example from Chicago Rawhide. In the preferred form of the invention, the outer extremities of the flexible rings shown in FIG. 2A are bent away from the housing chamber and toward the cavity 70 to achieve the back pressure advantage described above. Similarly, the flexible rings 74 of the seal 50 are bent in toward the cavity to provide the most effective combination (FIG. 2B).

The use of additional lip seals and/or the use of one ring or of more than two rings per seal is contemplated depending on the particular application.

The use of ground and hard-coated surfaces in contact with the seals enables the maintenance of precise dimensional tolerances which, after being properly specified and maintained, result in the most satisfactory working clearances under high pressure loading. This results in especially free revolution of the rotor and at the same time minimizes line gas leakage beyond acceptable levels and maximizes seal life.

The combination of components described is most effective because it provides a sealing arrangement in a high pressure pneumatic conveying system which does not compromise conveying line gas volume losses and because it accomplishes this without unacceptable cost nor undue maintenance. It will be understood that various changes and additions may be made to this combination without departing from the spirit of the invention particularly as defined in the following claims.

What is claimed is:

1. A high pressure rotary valve for use in conveying flowable solid material, said valve having a housing defining an inlet, an outlet, and a chamber defined between the inlet and outlet, a rotor including a rotor shaft, and rotor blades mounted on the shaft for moving the material from said inlet, through said chamber and to said outlet, shrouds mounted in spaced-apart relationship on said rotor shaft on opposite ends of said blades, said shrouds having an outer periphery moving adjacent said housing, and said shrouds defining said chamber therebetween, end plates positioned outwardly of said shrouds, openings defined by said end plates for receiving said rotor shaft, first lip seals mounted on said housing for engagement with each said outer periphery of the shrouds, and second lip seals mounted on said end plates for engagement with said rotor shaft at locations outwardly of said first lip seals.

2. A valve according to claim 1 wherein said outer periphery of each shroud is ground and hard coated in the area engaged by said first lip seals.

3. A valve according to claim 1 wherein said lip seals include at least one flexible ring adapted to bend relative to the surface engaged by the seals, and wherein the ring of said first seals is bent outwardly away from said chamber, and the rings of said second seals are bent inwardly toward said chamber.

4. A valve according to claim 3 wherein a cavity is defined between each said shroud and an end plate, and including means for maintaining elevated pressure within said pocket whereby said lip seals are subject to such pressure.

5. A valve according to claim 4 wherein said seals comprise multiple rings.

6. A valve according to claim 1 including bearings positioned between the rotor shaft and the housing, said bearings comprising angular contact bearings.

* * * * *